United States Patent [19]

Kiss

[11] Patent Number: 5,200,128
[45] Date of Patent: Apr. 6, 1993

[54] PROCESS FOR PRODUCING BINDER-CONTAINING FIBROUS MATS

[75] Inventor: Günter H. Kiss, Lesa, Italy
[73] Assignee: Lignotock GmbH, Sontra, Fed. Rep. of Germany
[21] Appl. No.: 834,481
[22] Filed: Feb. 11, 1992

Related U.S. Application Data

[63] Continuation of Ser. No. 530,109, May 29, 1990, abandoned.

[30] Foreign Application Priority Data

May 29, 1989 [DE] Fed. Rep. of Germany ....... 3917787

[51] Int. Cl.5 ...................... B32B 21/08; B29C 67/00
[52] U.S. Cl. ................................... 264/113; 264/112
[58] Field of Search ............... 264/510, 511, 518, 112, 264/113; 156/62.2, 62.4, 62.8; 425/80.1, 81.1, 82.1, 83.1

[56] References Cited

U.S. PATENT DOCUMENTS

| | | | |
|---|---|---|---|
| 2,543,101 | 2/1951 | Francis | 264/112 |
| 3,790,417 | 2/1974 | Paterson et al. | 156/62.8 |
| 4,104,340 | 8/1978 | Ward | 264/6 |
| 4,165,352 | 8/1979 | Volkman | 264/113 |
| 4,724,114 | 2/1988 | McFarland et al. | 264/510 |

*Primary Examiner*—Mary Lynn Theisen
*Attorney, Agent, or Firm*—Weintraub, DuRoss & Brady

[57] ABSTRACT

Process for producing binder-containing fibrous mats from lignocellulose fibres or the like together with stabilizing additives is described. These mats are then generally processed by hot pressing to shaped or moulded articles, such as for the internal lining of the passenger compartments of motor vehicles. The dry fibrous material thoroughly mixed with the binder is applied to a conveyor in such a way that there is an alternate application of several wood fibre layers and synthetic fibre layers. The accumulation densities of the synthetic fibres and the wood fibres are placed to produce a mat cross-section in accordance with a statistical distribution, or curve, which roughly corresponds to an edge-blurred, periodic comb profile. The curve base width for the synthetic, fibres is much smaller than that for the wood fibres. The individual fibre accumulations are interconnected by means of suitable adhesives.

4 Claims, 1 Drawing Sheet

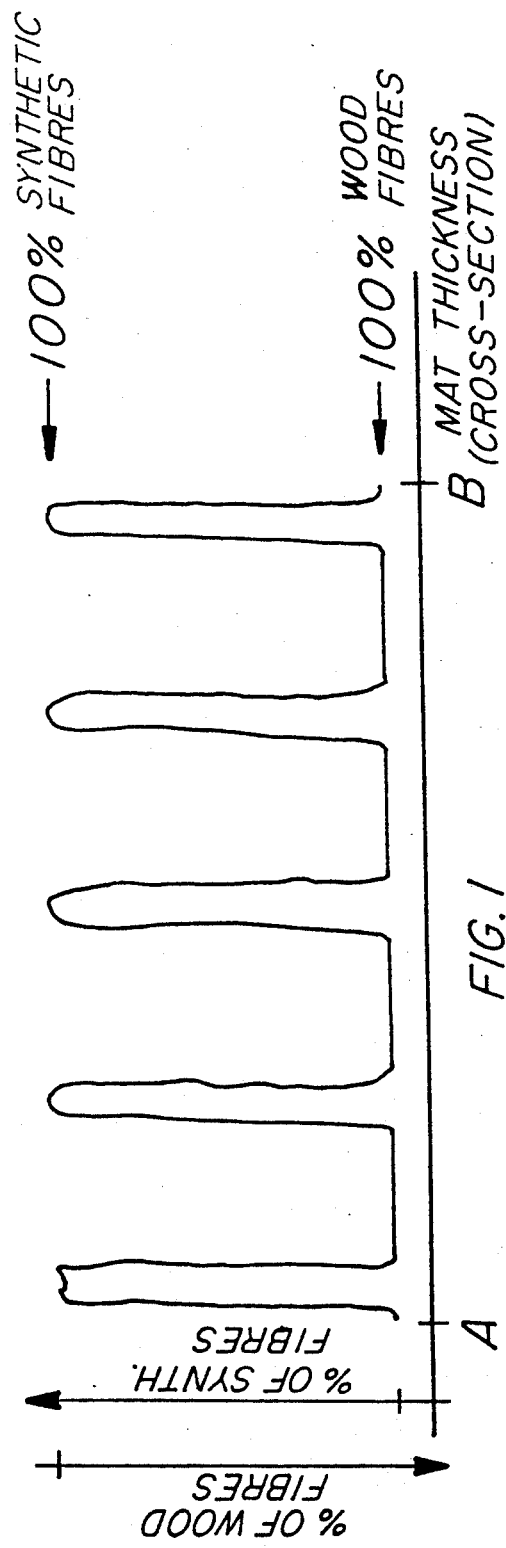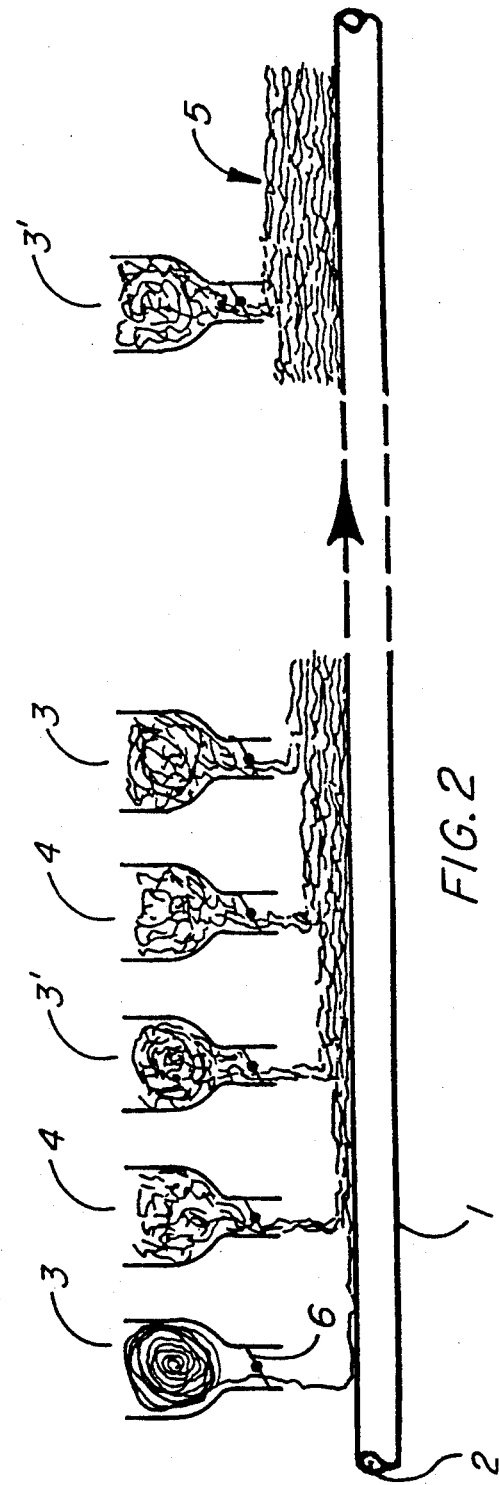

PROCESS FOR PRODUCING BINDER-CONTAINING FIBROUS MATS

This is a continuation of the application Ser. No. 07/530,109, filed May 29, 1990, now abandoned.

BACKGROUND OF THE INVENTION

1. Field of the Invention

The invention relates generally to a process for producing binder-containing fibrous mats.

2. Discussion of the Related Art

Such fibrous mats are known in many different compositions and are moulded or shaped in the most varied ways into self-supporting moulded or shaped articles.

Thus, e.g. a process for the hot pressing of shaped articles of the aforementioned type is known, in which for the shaping process a stabilizing support is applied on at least one side between the shaping surface of the shaping tool or mould and the mat fleece, as disclosed in German publication DE-OS 37 21 663. This process is characterized in that the stabilizing support is constituted by a composite fibre layer absorbing tensile forces in the surface direction, which is substantially extension or elongation-free, but under the heat action within the hot press is plastically deformable and is hardened or solidified immediately after the shaping process to a substantially elongation-free, inflexible covering.

A fibrous fleece mixture of lignocellulose fibres and cotton fibres is used, which is mixed with heat-hardening binders. This fibrous fleece mixture is embedded between two stabilizing supports which are substantially elongation-free in the surface direction and prior to the shaping of this raw mat blank a union is formed between the individual laminations, so that during the shaping or pressing process, the tensile forces which occur can be absorbed in troublefree manner. The necessary adhesion between the flexible stabilizing supports and the surface of the fibrous fleece mixture results from the fact that a heat-resistant self-adhesion occurs in the temperature range 60° to 150° C. The stabilizing support applied to one or both sides of a mat fleece can be applied according to the prior art either by sprinkling on one or more layers of high-strength threads, or as a prefabricated form such as a tangled fibre fleece composite. The heat-resistant adhesion between the stabilizing support and the wood fibre mat is distributed over several fibre layers, in order to ensure the aforementioned tensile force transfer.

It is also no longer novel in this connection to process and construct the stabilizing support in such a way that its air permeability is retained both before and after the shaping of the fibrous mat to a shaped or moulded article. For this purpose the stabilizing support thickness is kept very small compared with that of the fibrous fleece. It is fundamentally assumed that such a stabilizing support is provided on either one or both surfaces of the wood fibre fleece, but not in the interior of the mat blank.

Another known fibrous mat type is characterized by the fact that for stabilizing in the shaping process and for the transfer of forces into the middle of the tangled fibre fleece; a firm fabric is inserted. The firm fabric permanently absorbs the tensile and shear forces in the manner of a tension network. The fabric embedded in the fibrous fleece mat is only reached by the tensile forces of the shaping tool if the forces have already been transferred from the shaping tool surfaces onto the fibrous fleece mat. This generally leads to considerable damage in the structure of the fibrous mat before the shaping tool has reached the stabilizing fabric insert allowing the insert to come into action.

Therefore research has been carried out with the aim of producing fibrous fleece mats comprising a substantially homogeneous mixture of cellulose or lignocellulose fibres, which are not loadable for the shaping process; and longer synthetic threads, or the like, which absorb the tensile and shear forces. Heretofore it has been found that, at least in mass production, the necessary homogeneous sprinkling onto a conveying member for producing the fibrous fleece, cannot be realized in a technical manner. The pouring characteristics of the different fibre types always lead to an undesired and substantially uncontrollable separation of the individual fibre types. The resulting quality reduction of the finished fibrous mat can be compensated only to a certain extent by an increased use of expensive synthetic fibres. The increased use of synthetic fibers apart from increasing the cost of the product, leads to the disadvantage of air impermeability of the fibrous mat.

The problem solved by the present invention is to provide a process for producing fibrous mats from a mixture of wood and textile fibres to produce a mat that has a statistically averaged, homogeneous distribution of synthetic fibres absorbing tensile and shear forces and a minimum synthetic fibre proportion within the mat and over the cross-section, or thickness, thereof, and in particular, a minimized synthetic fibre proportion in the surface region of the mat.

SUMMARY OF THE INVENTION

According to the invention this problem is solved by applying an alternating application of several wood fibre layers and synthetic fibre layers in such a way that the accumulation densities of the synthetic and used wood fibers are placed over the thickness of the mat in accordance with a statistical distribution substantially corresponding to an edge-blurred, periodic comb profile, wherein the base width for the synthetic fibers is much smaller than that of the wood fibers.

The essential advantage of such a mat construction is that the synthetic fibres absorbing the tensile and shear forces are neither restricted to the outer surface regions, nor to a randomly formed central layer. Further, during the production of such a mat it is possible to avoid a disadvantageous separating effect such as occurs in the case of synthetic-wood fibre mixtures during mat production. Advantageously homogeneous shaping characteristics can be obtained through the concentration of the tension-resistant synthetic fibres in a plurality of individual synthetic fibre layers. The disadvantage of distributing tensile forces in an inadequate manner to the shaping tool over a localized central layer and via the latter only is obviated. There is also no need to use a higher synthetic fibre concentration either in a fibrous mixture or to restrict synthetic fibre to the top layers of the fibrous mat, with the resulting prevention of the necessary gas permeability of the mat; for satisfactory processability to the shaped article. The multilayer nature of the fibrous mat of the present invention makes it possible to keep the synthetic fibre concentrations in the individual layers extremely low, accompanied by a simultaneous maximum homogenization of the shaping characteristics of the fibrous fleece structure. The low weight per unit area of the individual layers ensures an adequate penetration between the wood and synthetic fibre layers in the transition areas therebetween and therefore assists the task of the adhesive between the layer arrangements in a particularly advantageous manner.

The adhesion between the synthetic and wood fibres can be additionally improved by using synthetic fibres which become sticky at higher temperatures, such as e.g. when plasticizing the mat blanks by steam treatment and which in turn shrink in the case of a further temperature rise such as in hot pressing to the finished article. The shrinkage during hot pressing prevents a failure of the mat due to tensile and shear stressing and consequently improves the shapability of the mat.

The synthetic fibre layers can be sprinkled on. However, it is also possible to use prefabricated tangled synthetic fleeces which are then drawn as web material from reels positioned between the sprinkling or spreading heads for the wood fibres. A particular advantage in this procedure is that synthetic fibre fleeces can be used whose fibres are at least partly oriented in the preferred directions, e.g. orthotropically, so that the tensile strength important for the shaping of the mats can be influenced in a direction-oriented manner. By using such webs it is also easier to control the uniformity of the characteristics of prefabricated synthetic fibre fleeces, which reduces the mat tolerance range with respect to the shaping characteristics thereof.

BRIEF DESCRIPTION OF THE DRAWINGS

FIG. 1 is a curve of the fibre accumulation as a function of the mat thickness.

FIG. 2 is a diagrammatic representation of an apparatus for performing the process of the present invention.

DESCRIPTION OF THE PREFERRED EMBODIMENT

As seen in FIG. 1, according to the present invention a curve is obtained for the synthetic fibre accumulation distribution and also that of the wood fibres which in cross-section over the mat thickness which roughly corresponds to a comb profile, but which has blurred sides or edges 27. The base width 23 of the curve parts for the synthetic fibres is much smaller than the curve base width 25 of the thickness distribution of the wood fibres. The X-axis 26 reproduces the mat-cross-section, or thickness, with one mat surface at point A and the opposite mat surface at point B. Along the X-axis 26 is shown the distribution of both the synthetic and the wood fibres. On the Y-axis 29 is shown the proportion of synthetic fibres from 0 to 100% and, in the opposite direction, the proportion of wood fibres from 100 to 0%. The blurred edges 27 of the transition from synthetic to wood fibres, and vice versa, symbolically represent the degree of mixing between the fibres in the transition areas, i.e. the overlapping boundary line between the synthetic fibre layer and the wood fibre layer which is desired for the connection or join therebetween.

FIG. 2 diagrammatically shows, in cross-section, an apparatus for producing the desired statistical distribution (FIG. 1) over the mat thickness. To a conveyor 1, e.g. a belt conveyor, with guide pulleys 2, synthetic fibre material 9 and wood fibre 11 material is applied from a plurality of overhead storage containers 7. From a storage container 3 synthetic fibre material is initially applied to the conveyor 1. The synthetic fibre 9 is present there in the form of reel-like wound, thin tangled fibre synthetic mats 10. This is followed by the sprinkling of wood fibre material 11 onto the composite synthetic fibre material 9 from an overhead storage container 4. Then, once again following the movement direction of the conveyor, synthetic fibre material 9 in loose filament form 13 is sprinkled on from a storage container 3'. In this case both the synthetic 9 and the wood fibre 11 materials are in pourable form.

As a function of the desired number of alternating synthetic and wood fibre layers, a multilayer, or multiplane, mat 5 is produced with a plurality of alternately succeeding overhead storage containers 7 for the individual fibre types. In accordance with the number of storage containers 3, 4, 3' etc. used in the process sequence and whose exit ports can be closed and opened in continuously regulatable manner by dosing members 6, the desired multiplane mat 5 is obtained.

To the pourable wood fibre 11 material within the overhead storage container 4 are added binders in the known manner. Further additives can be added both to the storage containers for the wood fibres 4 and to those 3, 3' for the synthetic fibres. In addition, between the individual storage containers 3, 4, 3' there can be gluing stations (not shown) or the like. At the end of the conveyor the multiplane mat 5 can be passed through a needling station. (not shown). Suitable stripping members can be provided between the individual overhead containers 7, or sprinkling station, for an additional homogenization of the particular mat layer.

Having, thus, described the invention, what is claimed is:

1. A method of forming a laminated fibrous mat, comprising the steps of:
   (a) unrolling a prefabricated tangled fiber synthetic mat onto a conveyor to define a first layer; the synthetic mat being formed from a material which tends to shrink and to become sticky upon heating;
   (b) distributing wood fibers onto the synthetic mat as it travels along the conveyor to form a second layer;
   (c) distributing synthetic fiber material in loose filament form onto the second layer to define a third layer;
   (d) distributing wood fibers onto the third layer to form a fourth layer; and
   (e) distributing synthetic fiber material in loose filament form onto the fourth layer to define a fifth layer;
wherein the accumulation densities of the synthetic and wood fibers are deposited in accordance with a statistical distribution substantially corresponding to an edge-blurred, periodic comb profile, and wherein the thickness of each of the synthetic fiber layers is substantially less than the thickness of the wood fiber layers.

2. The method of claim 1, further comprising a step of plasticizing the mat by treatment with steam to cause the synthetic fiber layers to become sticky and to fuse the mat together.

3. The method of claim 2, further comprising the steps of cutting the mat into sections and hot pressing the sections sequentially in a heated mold to form molded articles which are permeable to air.

4. The method of claim 1, wherein the fibers in the first prefabricated layer are orthotropically oriented.

* * * * *